(12) United States Patent
Huang

(10) Patent No.: US 7,780,435 B2
(45) Date of Patent: Aug. 24, 2010

(54) INJECTION MOLDING APPARATUS HAVING A SPRUE BUSHING FOR COMMUNICATION WITH A NOZZLE

(75) Inventor: Chien-Feng Huang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 203 days.

(21) Appl. No.: 12/118,912

(22) Filed: May 12, 2008

(65) Prior Publication Data

US 2009/0017155 A1    Jan. 15, 2009

(30) Foreign Application Priority Data

Jul. 13, 2007    (CN) .................... 2007 1 0201070

(51) Int. Cl.
 *B29C 45/18*    (2006.01)
(52) U.S. Cl. ...................... 425/567; 425/569
(58) Field of Classification Search ............ 425/567, 425/569
See application file for complete search history.

(56) References Cited

U.S. PATENT DOCUMENTS

| 6,910,877 B2 * | 6/2005 | Berceanu et al. ............ 425/567 |
| 7,351,055 B2 | 4/2008 | Yoshioka |
| 2004/0037914 A1 * | 2/2004 | Takeuchi et al. ............ 425/567 |

FOREIGN PATENT DOCUMENTS

JP    57-59732    * 4/1982    .................. 425/567

* cited by examiner

*Primary Examiner*—Tim Heitbrink
(74) *Attorney, Agent, or Firm*—Andrew C. Cheng

(57) ABSTRACT

An apparatus for injection molding is provided. The apparatus includes an injection unit and a mold unit. The injection unit includes a nozzle having a first flat end surface. The mold unit includes a sprue bushing for communicating with the nozzle. The sprue busing has a second flat end surface. The sprue bushing is in contact with the first flat end surface of the nozzle. Wherein a protrusion is formed on one of the first flat end surface of the nozzle and the second flat end surface of the sprue bushing, and a corresponding recess is defined on the other of the first flat end surface of the nozzle and the second flat end surface of the sprue bushing. The protrusion is engaged in the recess.

12 Claims, 7 Drawing Sheets

INJECTION MOLDING APPARATUS HAVING A SPRUE BUSHING FOR COMMUNICATION WITH A NOZZLE

BACKGROUND

1. Technical Field

The present invention relates to an apparatus for injection molding.

2. Description of Related Art

Injection molding has been widely used for manufacturing plastic, vitreous, or metal articles.

Referring to FIG. 6, a typical apparatus for injection molding includes an injection unit 550 and a mold unit 580. The injection unit 550 may include a nozzle 510 and a screw (not shown) movable in the nozzle 510 for bringing materials to the tip of the nozzle 510. The mold unit 580 may include a mold 520, a sprue bushing 530 inserted in the mold 520, and a mounting block 560 for positioning the sprue bushing 530. The sprue bushing 530 is for communicating with the nozzle 510 and transmitting the materials to the mold 520. The sprue bushing 530 has an orifice 535 at an end thereof. The nozzle 510 is dipped into the orifice 535 during injection molding, and is detached away from the orifice 535 when the injection molding process is completed. The sprue bushing 530 and the nozzle 510 each have a spherical end surface for closely contacting with each other. However, in case abrasion of the spherical end surfaces occurs, the spherical end surfaces of the nozzle 510 and the sprue bushing 530 may no longer closely contact with each other, and thus materials 540 may flow out.

In addition, it is difficult to make the spherical end surfaces to be closely matched with each other, referring to FIG. 7, a gap 640 may exist between the spherical end surfaces of a nozzle 610 and a sprue bushing 630, therefore, additional time is required for machining the spherical end surfaces of the nozzle 610 and the sprue bushing 630.

What is needed, therefore, is an apparatus for injection molding, which can overcome the above shortcomings.

SUMMARY

An exemplary apparatus for injection molding is provided. The apparatus includes an injection unit and a mold unit. The injection unit includes a nozzle having a first flat end surface. The mold unit includes a sprue bushing for communicating with the nozzle. The sprue bushing has a second flat end surface. The sprue bushing is in contact with the first flat end surface of the nozzle. Wherein a protrusion is formed on one of the first flat end surface of the nozzle and the second flat end surface of the sprue bushing, and a corresponding recess is defined on the other of the first flat end surface of the nozzle and the second flat end surface of the sprue bushing. The protrusion is engaged in the recess.

Other advantages and novel features of the present apparatus for injection molding will become more apparent from the following detailed description of embodiment when taken in conjunction with the accompanying drawings.

BRIEF DESCRIPTION OF THE DRAWINGS

Many aspects of the apparatus for injection molding can be better understood with reference to the following drawings. The components in the drawings are not necessarily drawn to scale, the emphasis instead being placed upon clearly illustrating the principles of the present apparatus. Moreover, in the drawings, like reference numerals designate corresponding parts throughout the several views.

DETAILED DESCRIPTION OF THE EMBODIMENTS

Embodiments of the present apparatus for injection molding will now be described in detail below and with reference to the drawings.

Figure 1:
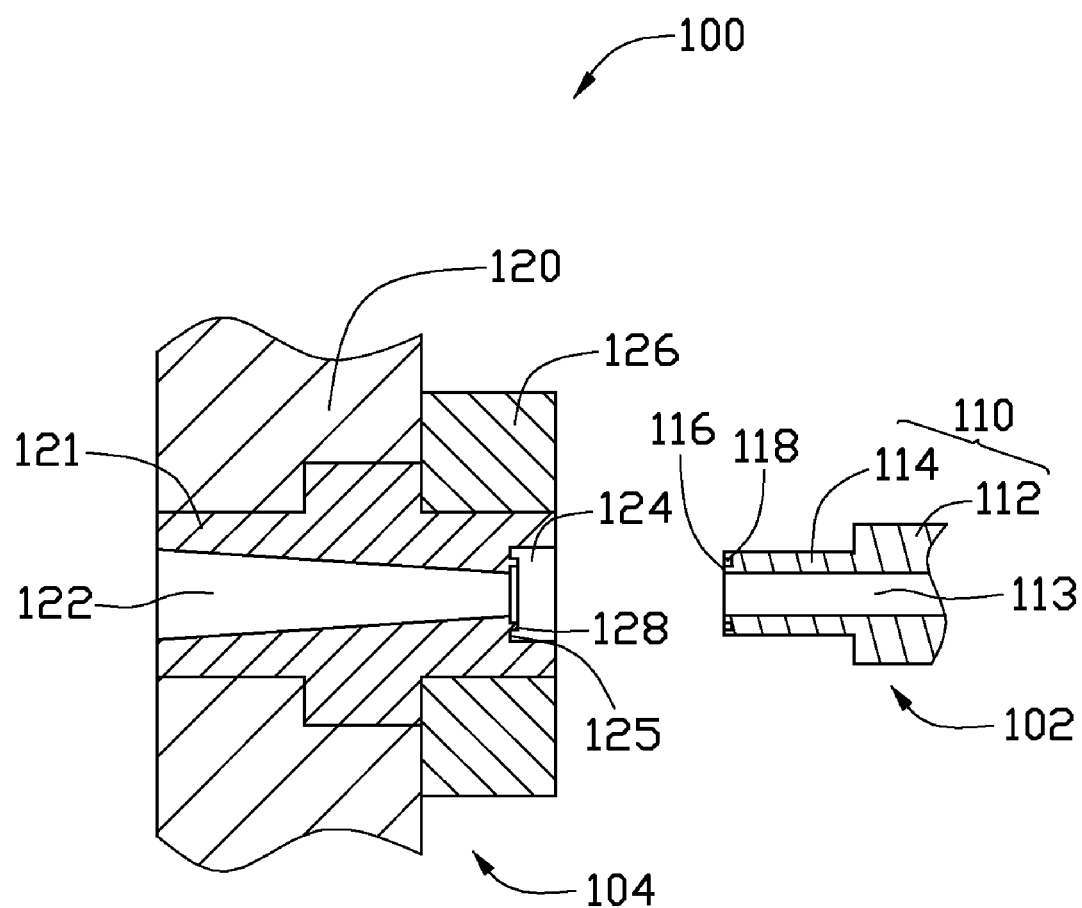
FIG. 1 is a disassembled, cross-sectional and partially cutaway view of an apparatus for injection molding in accordance with a first embodiment.
Figure 2:
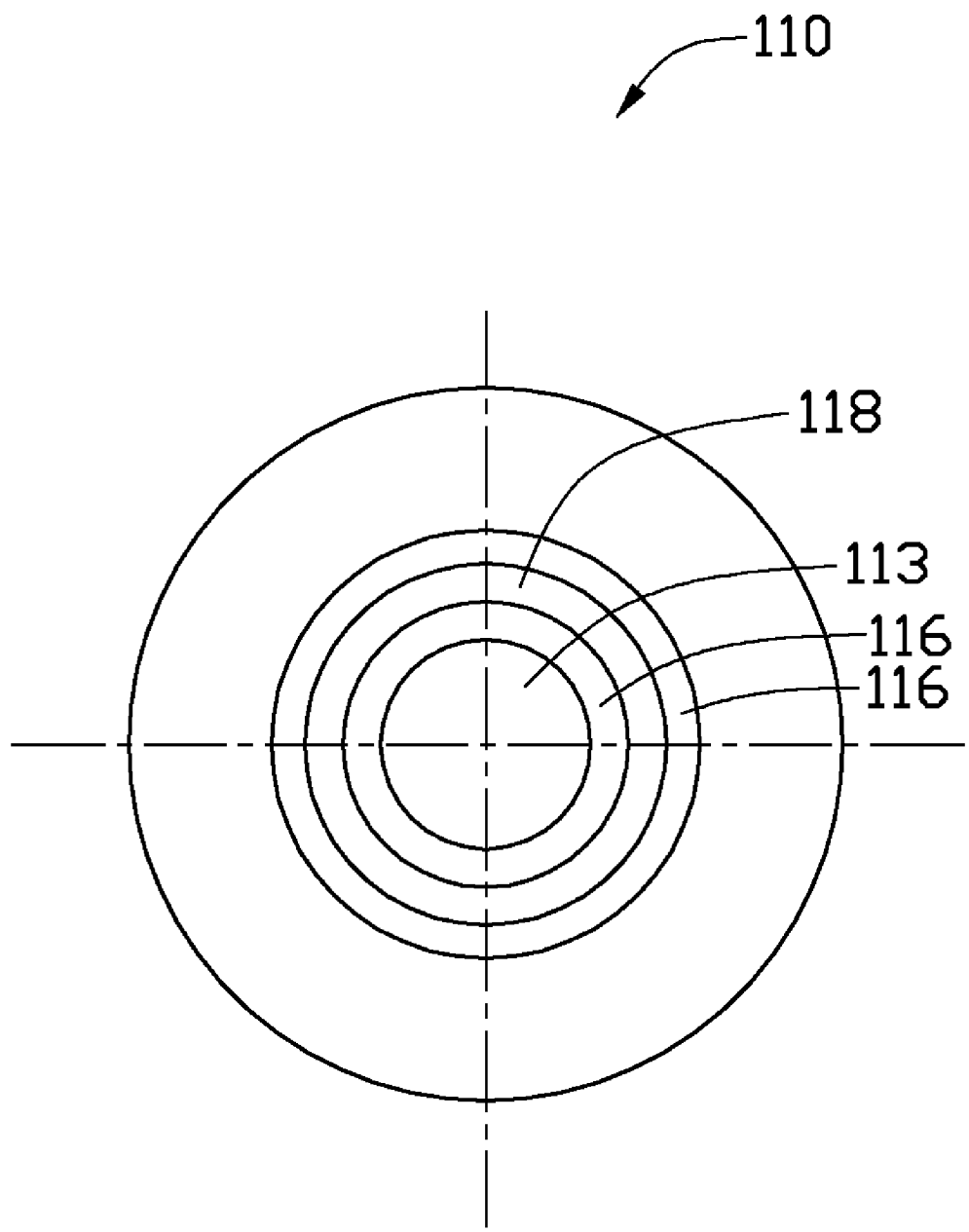
FIG. 2 is a left side elevational view of the nozzle shown in FIG. 1.

Referring to FIGS. 1 and 2, an exemplary apparatus 100 for injection molding in accordance with a first embodiment, is provided. The apparatus 100 includes an injection unit 102 and a mold unit 104.

The injection unit 102 includes a nozzle 110 with a nozzle body 112 and a nozzle tip 114. A passage 113 is defined in the nozzle 110 for communicating the nozzle tip 114 with the nozzle body 112. The injection unit 102 may further include a feed screw (not shown) for bringing materials to a distal end of the nozzle tip 114 through the passage 113. The nozzle tip 114 is in a cylindrical shape, and has a first flat end surface 116 at the distal end thereof. The passage 113 terminates at the first flat end surface 116. A recess 118 in a circular shape, is defined in the first flat end surface 116. The recess 118 is spaced apart from the passage 113 by a part of the first flat end surface 116.

The mold unit 104 includes a mold 120, a sprue bushing 121 and a mounting block 126. The sprue bushing 121 is defined in the mold 120. The mounting block 126 is configured for positioning the sprue bushing 121. The sprue bushing 121 is configured for communicating with the nozzle tip 114, and transmitting the materials from the nozzle tip 114 to the mold 120. The sprue bushing 121 includes a sprue 122 and an orifice 124 proximate to an end of the sprue 122. A second flat end surface 125 is defined at the bottom of the orifice 124, and the sprue 122 terminates at the second flat end surface 125. An annular protrusion 128 is defined on the second flat end surface 125. The protrusion 128 is spaced apart from the sprue 122 by a part of the second flat end surface 125.

Figure 3:
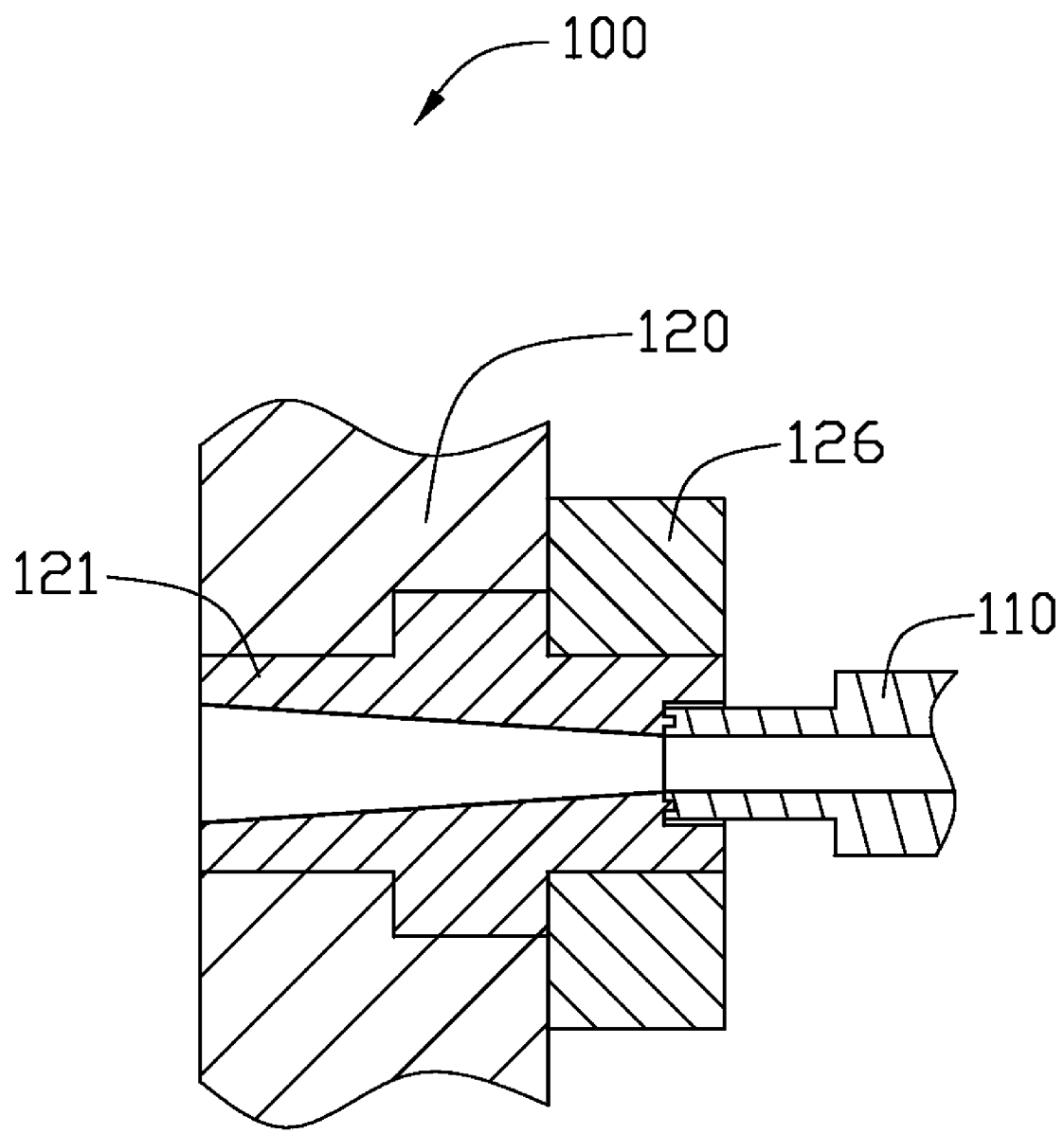
FIG. 3 is an assembled view of the apparatus shown in FIG. 1.

During injection molding of the mold 120, referring to FIG. 3, the nozzle tip 114 of the nozzle 110 is firstly dipped into the orifice 124 of the sprue bushing 121, and the protrusion 128 is then engaged into the recess 118. The protrusion 128 and the recess 118 cooperate with each other to align the nozzle 110 with the sprue bushing 121, so as to allow the first flat end surface 116 of the nozzle 110 to closely contact with the second flat end surface 125 of the sprue bushing 121, which prolong the lifespan of the nozzle 110. The process for making a flat surface is much easier than a spherical surface, resulting less time required for making the first flat end surface 116 and the second flat end surface 125, thus a high precision of the first flat end surface 116 and the second flat end surface 125 can be achieved.

Figure 4:
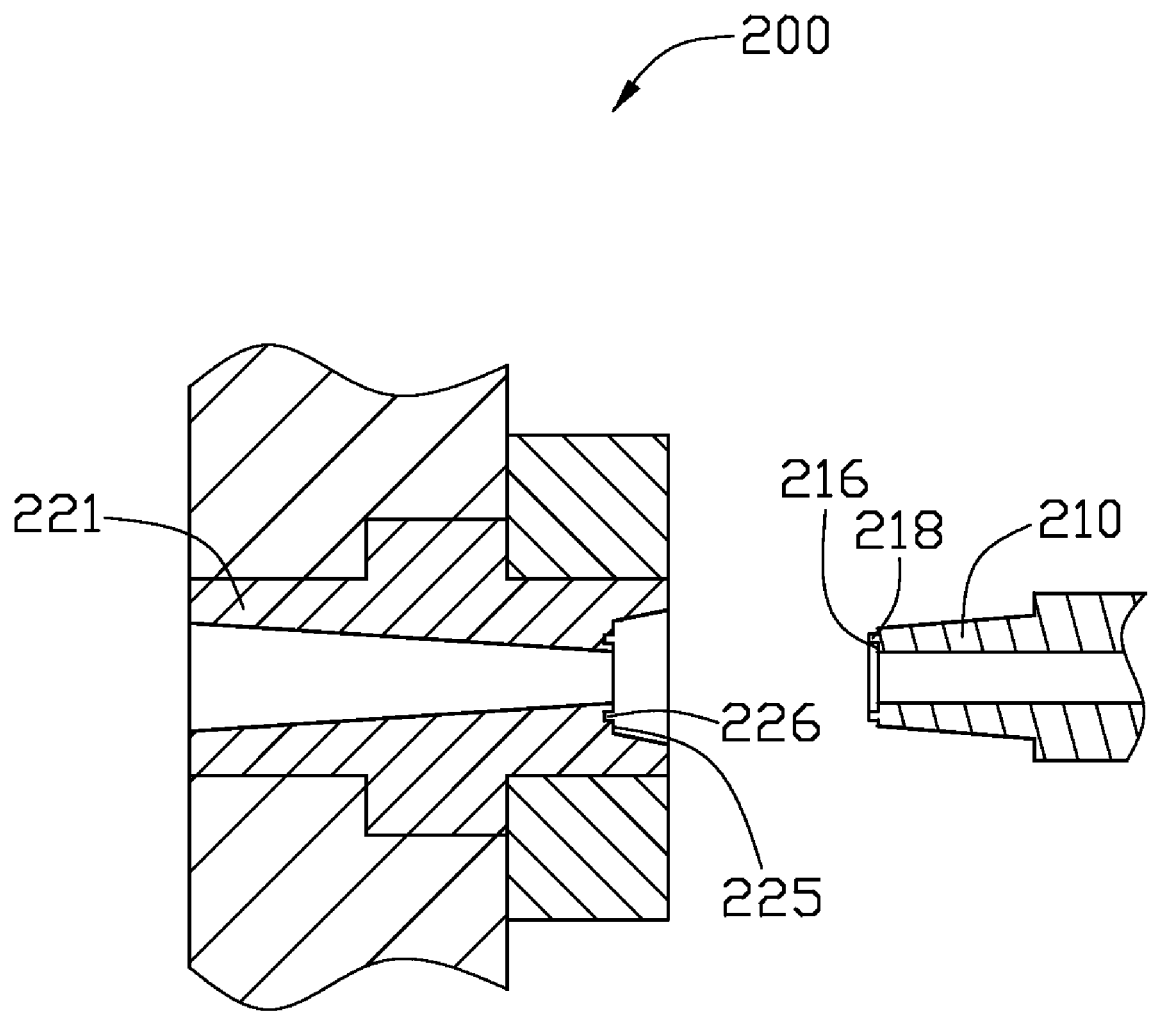
FIG. 4 is a disassembled, cross-sectional and partially cutaway view of an apparatus for injection molding in accordance with a second embodiment.
Figure 5:
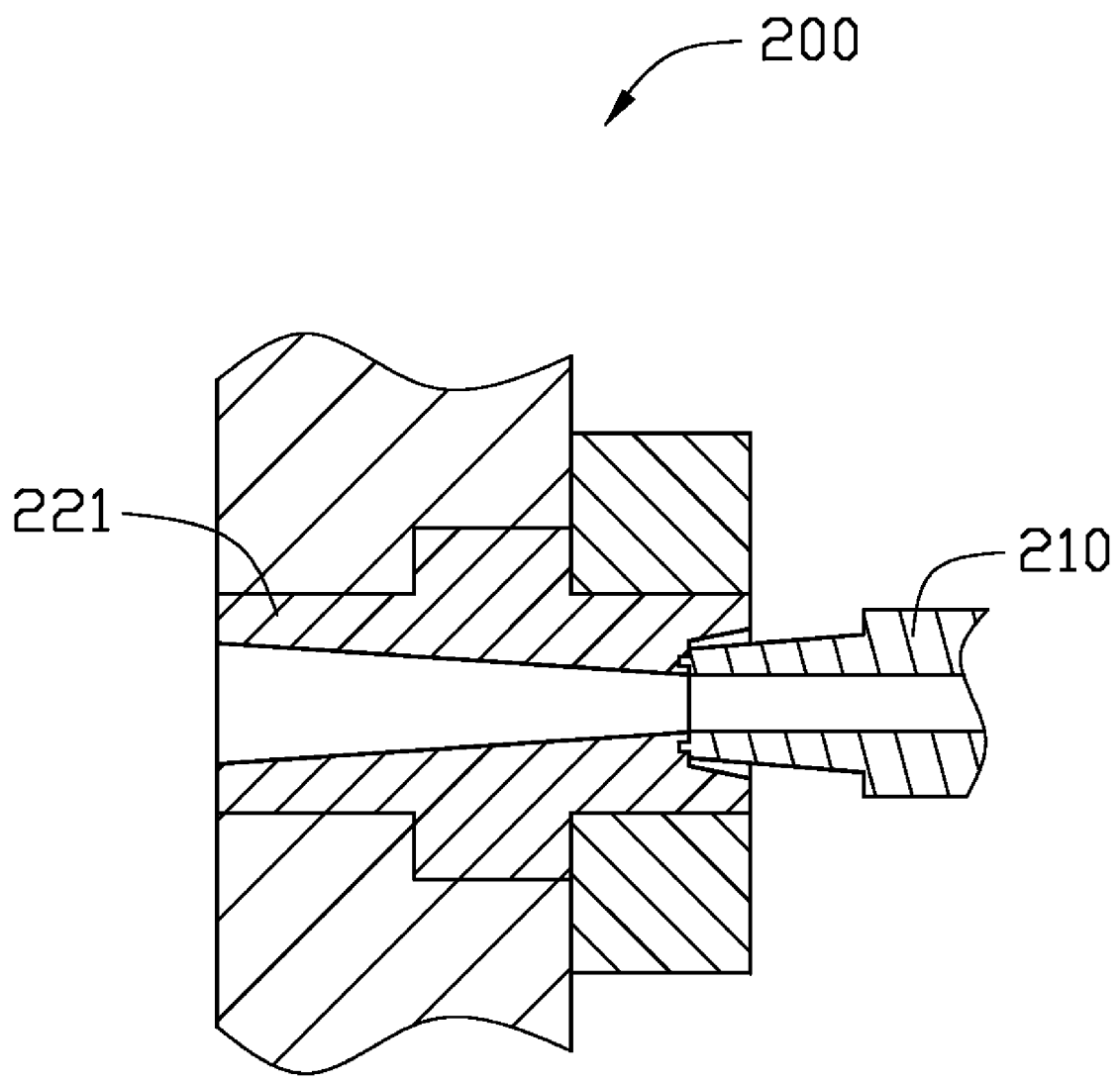
FIG. 5 is an assembled view of the apparatus shown in FIG. 4.
Figure 6:
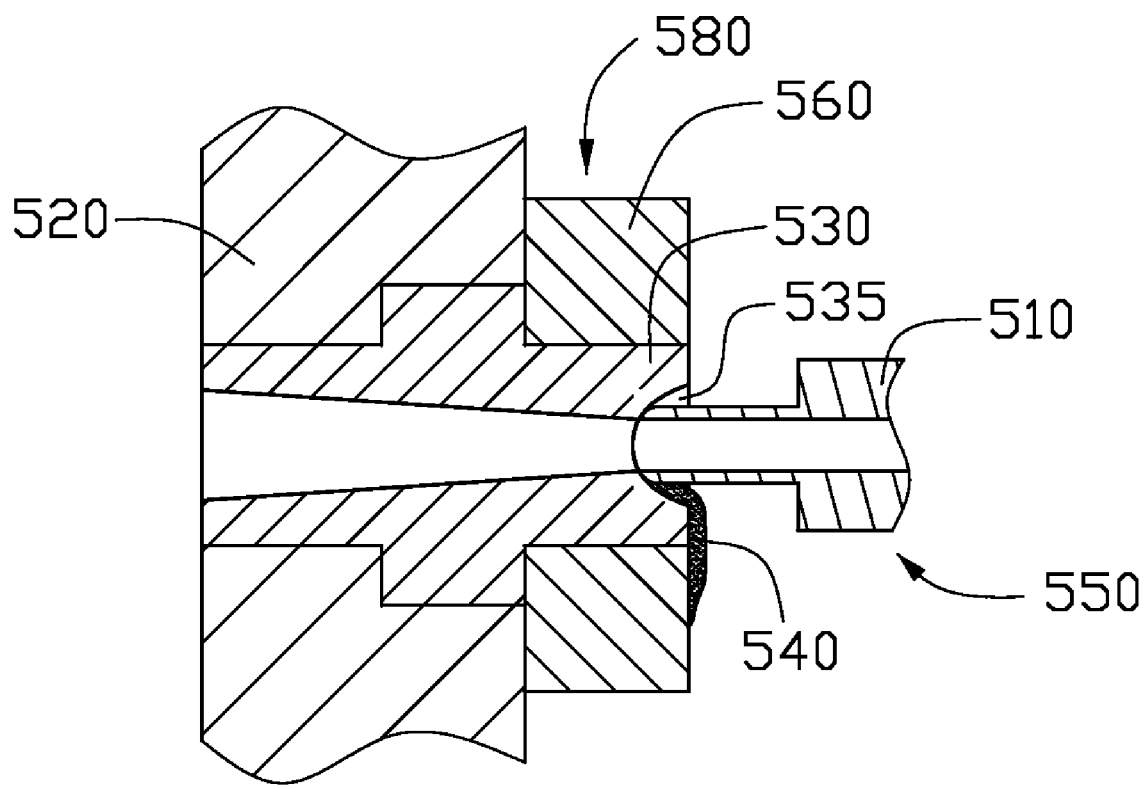
FIG. 6 is an assembled view of a conventional apparatus for injection molding.
Figure 7:
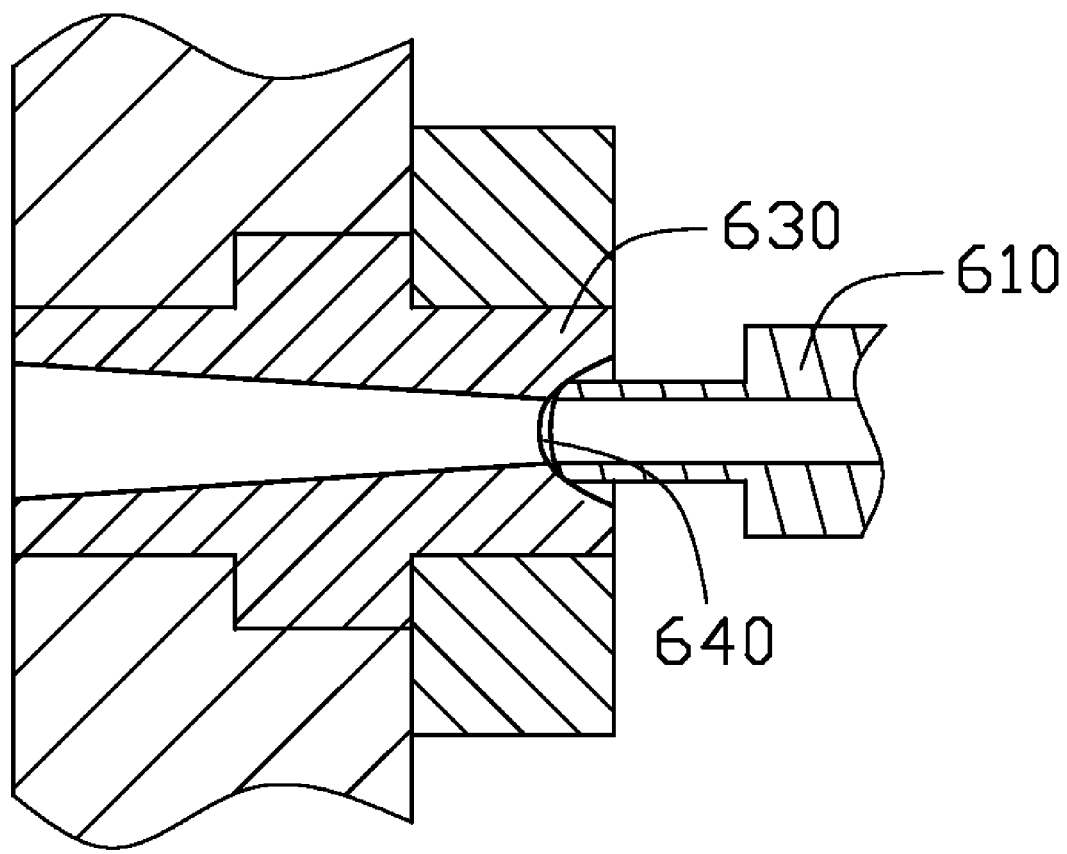
FIG. 7 is an assembled view of another conventional apparatus for injection molding.

Referring to FIGS. 4 and 5, an exemplary apparatus 100 for injection molding in accordance with a second embodiment, is provided. The apparatus 200 is essentially similar to the apparatus 100 illustrated above, however, a protrusion 218 is formed on the first flat end surface 216 of the nozzle 210, and a corresponding recess 226 is defined in the second flat end surface 225 of the sprue bushing 221. The protrusion 218 is spaced apart from the passage of the nozzle 210 by a part of the first flat end surface 216, and the recess 226 is spaced apart from the sprue of the sprue bushing 221 by a part of the second flat end surface 225.

It is understood that the above-described embodiments are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. An apparatus for injection molding, the apparatus comprising:
    an injection unit comprising a nozzle, the nozzle having a first flat end surface and a passage defined therein extending toward and terminating at the first flat end surface; and
    a mold unit comprising a sprue bushing for communicating with the nozzle, the sprue bushing having a second flat end surface for contacting the first flat end surface of the nozzle, and a sprue defined therein extending toward and terminating at the second flat end surface, wherein a protrusion is formed on one of the first flat end surface of the nozzle and the second flat end surface of the sprue bushing, and a corresponding recess is defined in the other of the first flat end surface of the nozzle and the second flat end surface of the sprue bushing, the protrusion and the recess are spaced apart from the passage and the sprue by a part of the first flat end surface or a part of the second flat end surface, the protrusion is for engaging in the recess.

2. The apparatus as described in claim 1, wherein the sprue bushing has an orifice proximate to the sprue, the orifice being in a cylindrical or truncated cone shape, the second flat end surface being formed in the orifice at the bottom thereof.

3. The apparatus as described in claim 2, wherein the nozzle has a nozzle body and a nozzle tip in a cylindrical or truncated cone shape, the first flat end surface being formed on the distal end of the nozzle tip, the nozzle tip being dipped into the orifice of the sprue bushing.

4. The apparatus as described in claim 1, wherein the protrusion is formed on the second flat end surface of the sprue bushing, the recess being defined in the first flat end surface of the nozzle.

5. The apparatus as described in claim 1, wherein the protrusion is formed on the first flat end surface of the nozzle, the recess being defined in the second flat end surface of the sprue bushing.

6. The apparatus as described in claim 1, wherein the protrusion is an annular protrusion, and the recess is circular.

7. An apparatus for injection molding, the apparatus comprising:
    an injection unit comprising a nozzle, the nozzle having a passage defined therein and a first flat end surface with the passage terminating thereat; and
    a mold unit comprising a sprue bushing for communicating with the nozzle, the sprue bushing having a sprue defined therein and an orifice located at an end of the sprue, the orifice having a second flat end surface at a bottom thereof with the sprue terminating thereat, wherein a protrusion is formed on one of the first flat end surface of the nozzle and the second flat end surface of the sprue bushing, and a corresponding recess is defined in the other of the first flat end surface of the nozzle and the second flat end surface of the sprue bushing, the protrusion and the recess are spaced apart from the passage and the sprue by a part of the first flat end surface or a part of the second flat end surface when the nozzle is inserted in the orifice, wherein the first flat end surface is in contact with the second flat end surface and the protrusion is engaged in the recess.

8. The apparatus as described in claim 7, wherein the orifice is in a cylindrical or truncated cone shape.

9. The apparatus as described in claim 8, wherein the nozzle has a nozzle body and a nozzle tip in a cylindrical or truncated cone shape, the first flat end surface being formed on the distal end of the nozzle tip, the nozzle tip being inserted into the orifice of the sprue bushing.

10. The apparatus as described in claim 7, wherein the protrusion is formed on the second flat end surface of the sprue bushing, and the recess is formed in the first flat end surface of the nozzle.

11. The apparatus as described in claim 7, wherein the protrusion is formed on the first flat end surface of the nozzle, and the recess is formed in the second flat end surface of the sprue bushing.

12. The apparatus as described in claim 7, wherein the protrusion is an annular protrusion, and the recess is circular.

* * * * *